J. M. KEEP.
ROACH OR BUG TRAP.

No. 115,215. Patented May 23, 1871.

Witnesses.
C. H. Poole
John R. Young

Inventor.
James M. Keep,
by Prindle & Dyer,
Att'ys.

United States Patent Office.

JAMES M. KEEP, OF NEW YORK, N. Y.

Letters Patent No. 115,215, dated May 23, 1871.

IMPROVEMENT IN ROACH OR BUG-TRAPS.

The Schedule referred to in these Letters Patent and making part of the same.

To all whom it may concern:

Be it known that I, JAMES M. KEEP, of New York city, in the county of New York and in the State of New York, have invented certain new and useful Improvements in Roach or Bug-Traps; and do hereby declare that the following is a full, clear, and exact description thereof, reference being had to the accompanying drawing making a part of this specification, in which—

Figure 3:
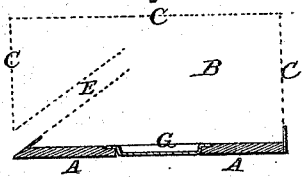
Figure 4:
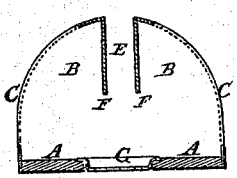
Figure 5:
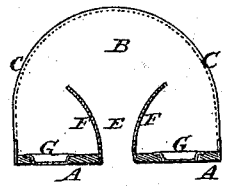

Figures 3, 4, and 5 are like views of three modifications of said invention.

Letters of like name and kind refer to like parts in each of the figures.

My invention has for its object the entrapping of roaches and many other kinds of vermin that infest buildings, which, as is well known, are unable to climb vertical or steeply-inclined surfaces unless the same are sufficiently rough to furnish a hold for their claws; and It consists in the construction and relative arrangement of the various parts of the trap, substantially as and for the purpose hereinafter specified.

In the annexed drawing—

A represents the bottom and B the sides of a box, the upper side of which inclines upward and inward from each end to a point near its longitudinal center, and is covered with wire-gauze or other similar material, C.

Figure 1:
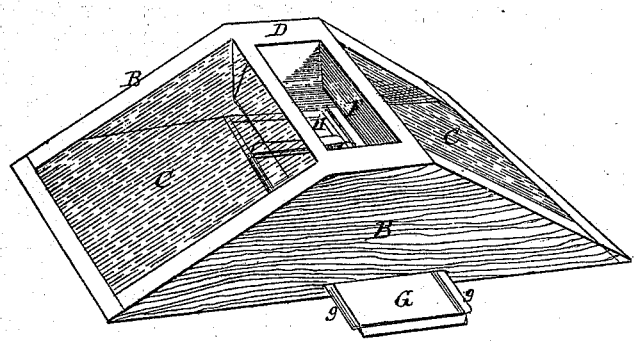
Figure 1 is a perspective view of my improved device.
Figure 2:
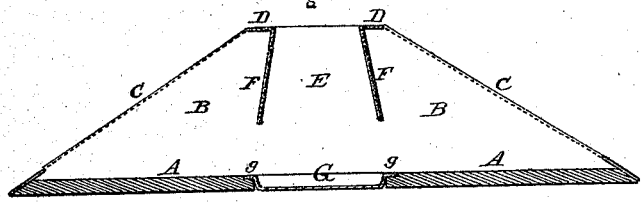
Figure 2 is a vertical longitudinal section of the same.

Between the inner ends of the sloping faces is a horizontal part, D, provided with an opening, E, having the relative size and shape shown in figs. 1 and 2, secured to and extending downward and slightly outward, from each side of which is a plate, F, of sheet metal or other suitable material, having a polished surface.

A metal tray, G, provided upon its sides with horizontally-projecting flanges $g$, is placed within a corresponding transverse opening, H, in the bottom A, immediately beneath the opening E, and held in position vertically by means of said flanges $g$, which fit into corresponding grooves within the sides of said opening H.

The device is now complete, and its operation is as follows:

The tray G being filled with suitable food, and the trap placed within reach of the vermin, the latter, in their efforts to obtain said food, will readily pass inward through the opening E; but once within the trap all retreat is cut off, as they are unable to climb or even reach the polished plates F.

Having thus fully set forth the nature and merits of my invention,

What I claim as new is—

The hereinbefore-described device, consisting of the box A, B, and D, partially inclosed by means of the gauze C, and provided with the entrance-tube E and food-receptacle G, substantially as and for the purpose specified.

In testimony that I claim the foregoing I have hereunto set my hand this 4th day of May, 1871.

J. M. KEEP.

Witnesses:
GEO. E. JEWETT,
JOHN F. WARD.